United States Patent [19]
Duerrstein et al.

[11] Patent Number: 5,736,040
[45] Date of Patent: Apr. 7, 1998

[54] FILTER ASSEMBLY INCLUDING A REINFORCED RADIAL SEAL

[76] Inventors: Rolf Duerrstein, Finkenweg 93, D-74321 Bietigheim; Hans Erdmannsdoerfer, Robert-Koch-Strasse 24, D-71640 Ludwigsburg; Bruno Sommer, Nippenburgstrasse 21, D-71636 Ludwigsburg; Helmut Storz, Terminusstrasse 26, D-71726 Benningen, all of Germany

[21] Appl. No.: 329,961

[22] Filed: Oct. 27, 1994

[30] Foreign Application Priority Data

Oct. 27, 1993 [DE] Germany ............ 43 36 638.4
Apr. 7, 1994 [DE] Germany ............ 44 11 968.2
Aug. 9, 1994 [DE] Germany ............ 44 28 139.0

[51] Int. Cl.⁶ ............................................. B01D 27/00
[52] U.S. Cl. ........................ 210/437; 210/450; 210/493.2
[58] Field of Search ........................ 210/437, 438, 210/440, 441, 450, 457, 193.1, 493.2, 483, 497.01; 55/502; 277/9, 179, 188 R, 189.5, 227–230

[56] References Cited

U.S. PATENT DOCUMENTS

| | | | |
|---|---|---|---|
| 2,906,552 | 9/1959 | White | 277/227 |
| 3,013,599 | 12/1961 | Riggs | 152/458 |
| 3,237,770 | 3/1966 | Humbert Jr. | 210/438 |
| 4,055,205 | 10/1977 | Witoff et al. | 277/229 |
| 5,374,355 | 12/1994 | Habiger et al. | 210/440 |

FOREIGN PATENT DOCUMENTS

| | | | |
|---|---|---|---|
| 237611 | 1/1961 | Australia | 210/493.1 |
| 824484 | 10/1969 | Canada | 210/493.2 |
| 559011 | 9/1993 | European Pat. Off. . | |
| 1094206 | 12/1960 | Germany . | |
| 1851221 | 5/1962 | Germany . | |
| 2429474 | 11/1975 | Germany . | |
| 4206519 | 9/1993 | Germany . | |
| 1062675 | 8/1959 | United Kingdom . | |
| 1151592 | 5/1969 | United Kingdom | 210/493.2 |
| 1511904 | 5/1978 | United Kingdom . | |
| 2134811 | 8/1984 | United Kingdom | 210/493.2 |
| 2163368 | 2/1986 | United Kingdom . | |

*Primary Examiner*—Matthew O. Savage
*Attorney, Agent, or Firm*—Evenson, McKeown, Edwards & Lenahan P.L.L.C.

[57] ABSTRACT

A filter arrangement formed with a housing and a center tube connected with the housing. In the filter arrangement, a metal-free filter cartridge is arranged which includes an accordion-folded, annular filter element. The filter cartridge is provided with end plates on the axial end faces of the annular filter element, at least one of the end plates having an elastic construction, and each elastic end plate is provided with a flexible supporting ring which is arranged directly adjacent a radial seal formed by the elastic end plate.

8 Claims, 4 Drawing Sheets

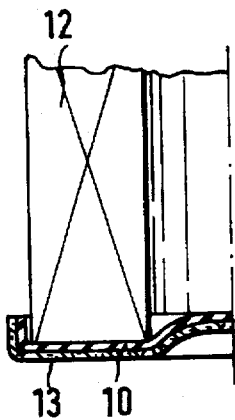
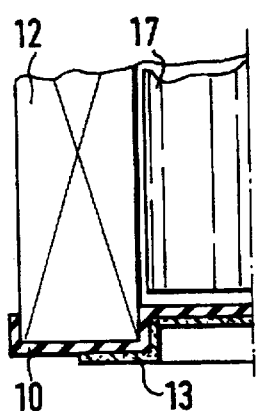
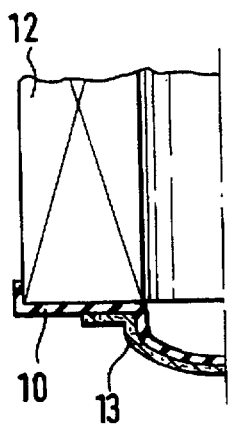
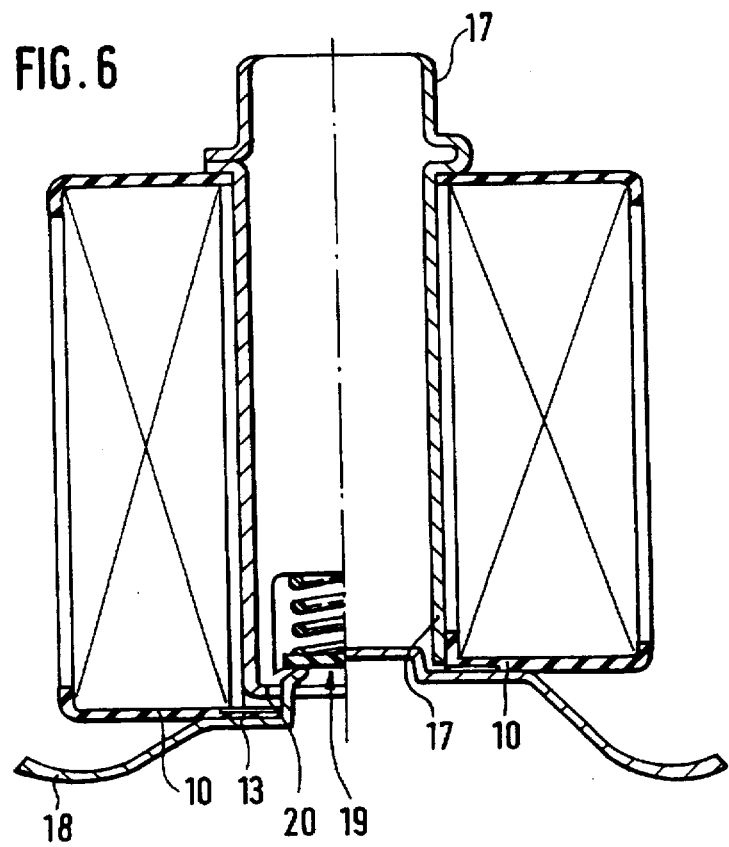

FILTER ASSEMBLY INCLUDING A REINFORCED RADIAL SEAL

BACKGROUND OF THE INVENTION

This invention relates to a filter arrangement comprising a housing, a center tube connected with the housing, an inlet opening for a medium to be filtered, an outlet opening for discharging filtered medium through the center tube, a metal-free filter cartridge comprising a concentrically arranged, accordion-folded filter element with end plates arranged on its axial end faces, at least one of the end plates being constructed to be elastic.

Published German Patent Application No. DE 4,206,519 discloses a filter arrangement which comprises an annular filter element. This annular filter element comprises an accordion-folded (or zig-zag folded) filter material. On the axial end faces, cover plates or sheets of sealing material are arranged which each seal tightly because they are connected to the filter material. The sealing material is shaped in the form of a radial seal; that is, it projects a certain distance radially inwardly beyond the filter material and, together with a housing connection piece, forms the sealing element.

Such radial sealing devices are subjected to very high tearing stress. There is a danger that the sealing material will tear when the filter element is inserted into the filter housing and, as a result, not only will the sealing material be damaged, but the effectiveness of the filter will also be compromised.

Although the publication attempts to establish a defined radial sealing dimension by means of a supporting ring, if this supporting ring is to have an effect, it must be relatively thick-walled and therefore considerably reduces the inside diameter of the housing connection piece.

Furthermore, Published German Patent Application No. DE 2,429,474 (=GB 1,511,904) discloses a filter element in which a radial seal is formed by sealing lips, the radial seal also being integrated into the end plate.

It is a disadvantage of these sealing lips that these are constructed to be very beaded. The sealing lips therefore considerably reduce the diameter of the housing connection piece or enlarge the outside diameter of the filter element.

SUMMARY OF THE INVENTION

It is therefore the object of the invention to provide an improved a filter arrangement.

Another object of the invention is to provide a filter arrangement which facilitates optimum utilization of the existing space.

A further object of the invention is to provide a filter arrangement which prevents damage to the cover of the end face which forms the radial seal.

An additional object of the invention is to provide a filter arrangement which may be used for liquid filters or for gas (e.g. air) filters.

These and other objects of the invention are achieved by providing a filter arrangement comprising a housing, a center tube connected with the housing, an inlet opening for a medium to be filtered and an outlet opening for discharge of filtered medium through the center tube; and a metal-free filter cartridge comprising a concentrically arranged, accordion-folded filter element with end plates on axial end faces thereof, at least one of the end plates being constructed to be resilient or elastic, wherein the resilient end plate forms a radial seal, and a flexible support ring is arranged on the resilient end plate adjacent the radial seal.

The principal advantage of the invention is the fact that a flexible supporting ring is provided which does not influence the sealing effect of the radial seal, requires no additional space and effectively prevents the end plate disk from being torn.

In accordance with one embodiment of the invention, the supporting ring is embedded in the resiliently constructed disk-like end plate. This creates a particularly intimate connection between the end plate and the supporting ring.

In accordance with another advantageous embodiment, the supporting ring is a felt ring or a thermoplastic element. Both materials have the characteristic that they do not influence the resilience of the radial seal and still promote the effect of the radial seal.

The radial seal for the filter element may be provided on the central opening of the end plate or on the outer circumference of the end plate. In both cases, the supporting ring is arranged in the immediate proximity of the radial seal.

These and other characteristics of preferred further embodiments of the invention, in addition to being recited in the claims, are also described in the specification and the drawings, and individual features thereof may each be implemented alone or as part of a group of features in the form of subcombinations in the case of the embodiment of the invention and may be used in other fields of use and may represent advantageous embodiments as well as embodiments that can be protected separately, for which protection is also claimed.

BRIEF DESCRIPTION OF THE DRAWINGS

The invention will be described in further detail hereinafter with reference to illustrative preferred embodiments shown in the accompanying drawing figures in which:

FIGS. 5a through 5c are representations of details of various filter element constructions;

FIG. 6 is a sectional view of a filter element with a center tube;

DETAILED DESCRIPTION OF PREFERRED EMBODIMENTS

The filter elements according to FIGS. 1 to 4 consist essentially of resilient, disk-like end plates 10 and 11, between which an accordion-folded filter paper 12 is arranged. For a simpler illustration, the respective housings of the filter arrangements with the unfiltered oil inlet and the clean oil outlet as well as the center tube through which the clean oil is discharged are not shown in the figures, except for FIG. 8. However, it is intended that corresponding housings be used with each of the embodiments of FIGS. 1–7. Housings of this type are generally known and are disclosed, for example, in German Registered Utility Model 18 51 221.

The filter elements may also be used for filtering gases, for example, for filtering intake air for an internal combustion engine, or for filtering air for the interior of a motor vehicle. In this case, the respective filter element is arranged in an air filter housing. Unfiltered air enters via an inlet through the outside wall of the housing and flows through the filter element toward the center of the assembly, i.e. the flow through the filter element takes place from the outside toward the inside. The filtered air chamber is situated in the interior of the filter element. The clean air may be discharged through a concentrically arranged center tube.

Figure 1A:
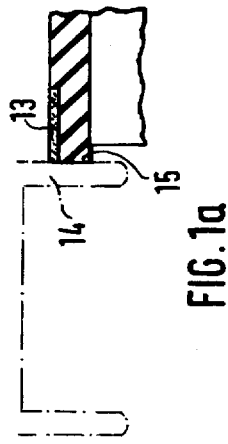
FIG. 1a is an enlarged view of a sealing arrangement for the filter of FIG. 1.
Figure 1:
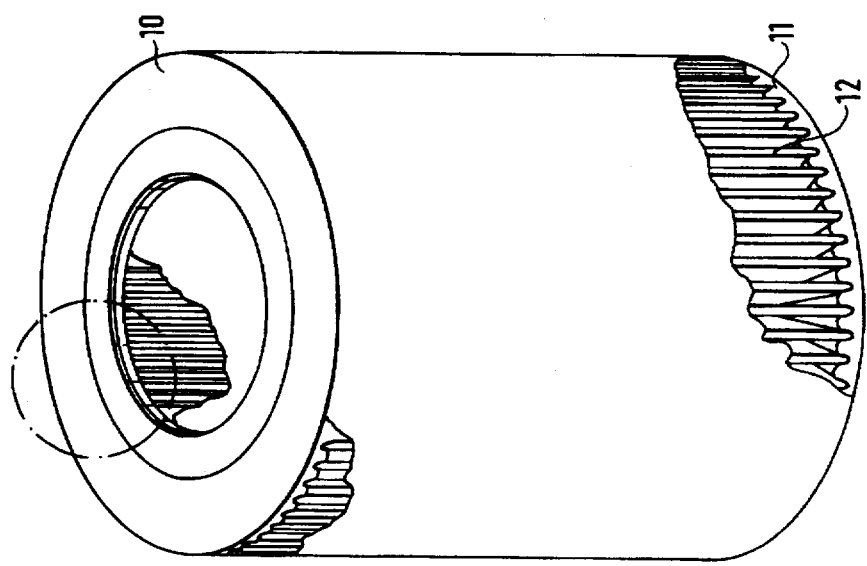
FIG. 1 is a perspective view of a filter element according to the invention comprising a flexible support ring.

As shown in FIG. 1, a flexible supporting ring 13 is arranged on the end plate 10. This flexible supporting ring 13 comprises a felt member which is embedded in the end plate 10. The radial sealing of the filter element with respect to the center tube 14, which is depicted by the broken line, occurs in the area 15 of the end plate 10. The supporting ring 13 effectively prevents damage to the radial seal but, on the other hand, is sufficiently flexible to assure a reliable radial sealing.

Figure 2:
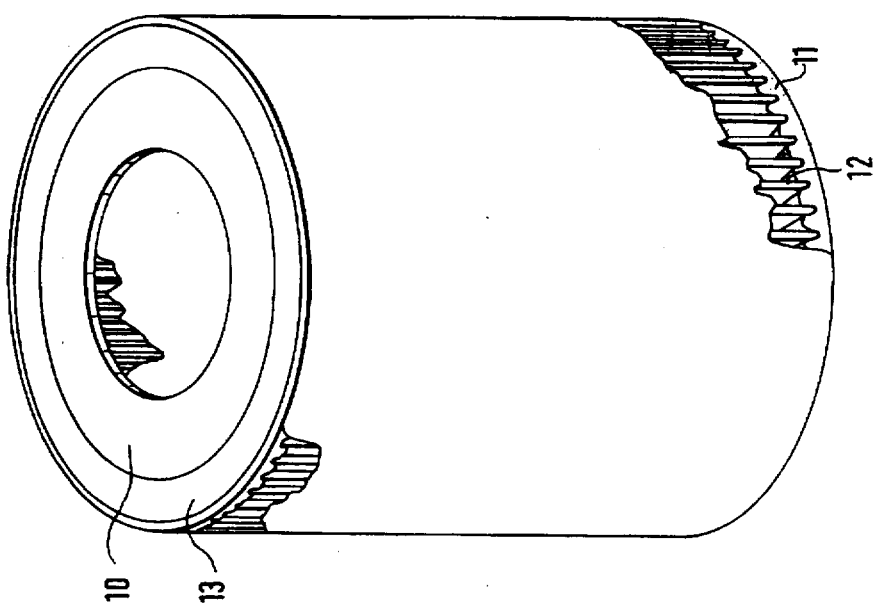
FIG. 2 is a perspective view of another embodiment of a filter element comprising a flexible support ring according to the invention.

FIG. 2 shows a filter element which is radially sealed on its outer circumference. The supporting ring 13 is therefore embedded on the outer edge in the end plate 10 and has an otherwise corresponding structure and function as the radial seal of FIG. 1.

Figure 4:
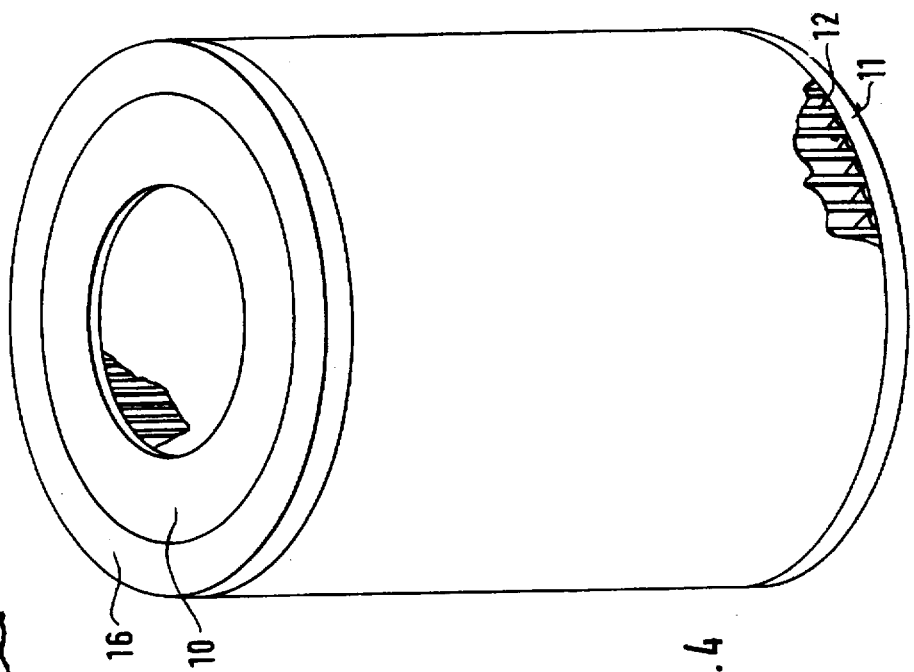
FIG. 4 is a perspective view of yet another filter element embodiment comprising a flexible support ring according to the invention.
Figure 3A:
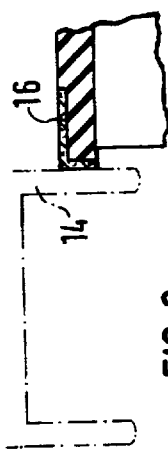
FIG. 3a is an enlarged view of a sealing arrangement for the filter of FIG. 3.
Figure 3:
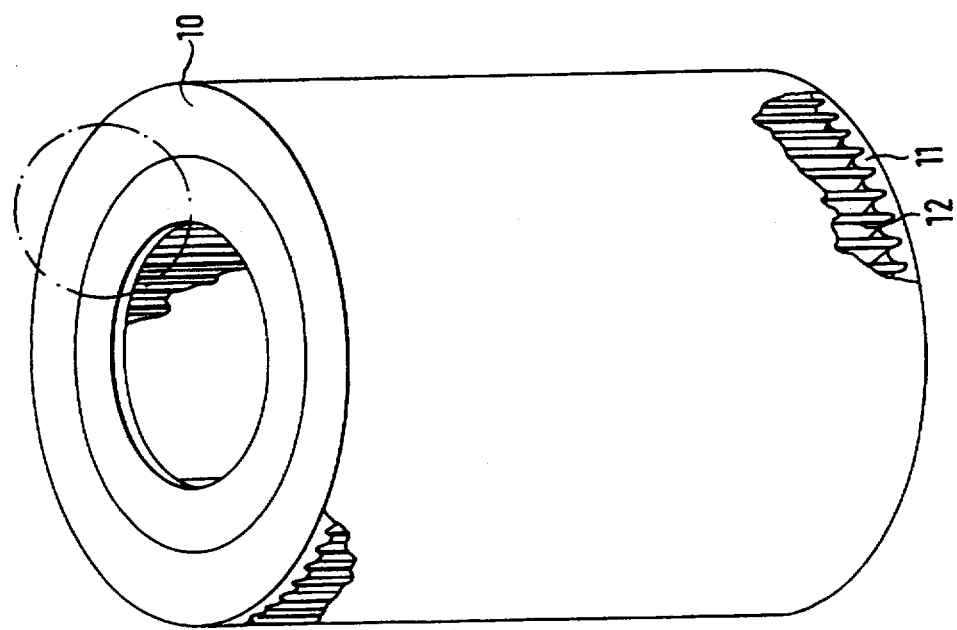
FIG. 3 is a perspective view of a still further embodiment of filter element comprising a flexible support ring according to the present invention.

Further variants are illustrated in FIGS. 3 and 4. In these embodiments, the supporting ring 16 serves simultaneously as the contact element of the radial seal. This means, as can be seen in detail in FIG. 3a, that the supporting ring 16 has an axial projection toward the interior and therefore constitutes the connection to the supporting tube 14. This construction is advantageous when the stressing of the radial seal is very high.

FIG. 4, in turn, shows the supporting ring 16 on the outer circumferential edge of the filter element. This supporting ring is also extended axially toward the interior and therefore forms a reinforcement for the radial seal.

FIGS. 5a–c are detail illustrations of filter elements which each comprise an accordion-folded filter paper 12 with one end plate 10, respectively.

FIG. 5a illustrates an end plate 10 which also extends over the center bore of the filter element and therefore closes this bore at one end. A flexible support ring 13 is arranged over the end plate 10. This support ring 13 entirely covers the axial end face of the filter end plate and therefore also reinforces its center bore end.

FIG. 5b also shows an end plate which extends over the center bore. In this case, the flexible supporting ring is arranged only in the central area of the filter element. A center tube 17 is also shown which extends into the proximity of the end plate 10.

FIG. 5c shows a filter element in which the end plate 10 arches convexly over the center bore. In this case also, the area of the end plate over the center bore is reinforced by the flexible support ring 13 so that higher pressure forces can be absorbed.

In a preferred embodiment, the ratio of the thickness of the support ring 13 or 16 to the thickness of the resilient end plate 10 or 11 is approximately 1:4.

FIG. 6 shows a filter element with a center tube. In its upper end area, the center tube 17 is fitted into a receiving bore, which is not shown here, and is fixed by appropriate means. At the opposite end, the end plate 10 of the filter element rests against a resilient contact surface of a spring element 18. A pressure control valve 19 is fastened to the spring element 18. The end plate 10 is reinforced in the radially inner area by a flexible support ring 13. The seal between the unfiltered-air side and the clean-air side of the filter is effected by means of the front edge 20 of the center tube which, in the installed condition, rests directly on the resilient end plate 10.

On the right of the center line, FIG. 6 depicts a variant which has no pressure control valve. The sealing-off of the filter element, i.e the sealing of the unfiltered-liquid side from the clean-liquid side, is effected by a radial sealing element which extends axially from the end plate 10 into the internal bore and rests against the center tube 17. The sealing-off of the filter element at its end adjacent the mounting of the center tube 17 may be effected as illustrated in FIG. 3a.

Of course, the different types of seals or variant embodiments can be combined with one another and are to be selected depending on the intended use.

An important advantage of resilient end plates with flexible supporting rings is their high temperature range. Such filter elements may be used for motor oil at temperatures of up to 150° C. In addition, it is possible to use the filter arrangement of the invention for fuel filters. The operability of the seal is maintained under all conditions of use. This means that the flexibility of the sealing elements is also not lost under the most severe conditions of use.

The flexible construction of the disk-like end plates also permits the use of center tubes made of a plastic material, such as polyurethane resin 6.6. As a result of this flexible construction, manufacturing tolerances can be compensated without any difficulty.

As a result of the absence of additional sealing elements, the existing space may be optimally utilized for the filter-effective medium. Additional sheet metal and paper end disks are also eliminated.

Additional advantages include being readily disposable, having a low weight, and being resistant to corrosion.

Figure 7:
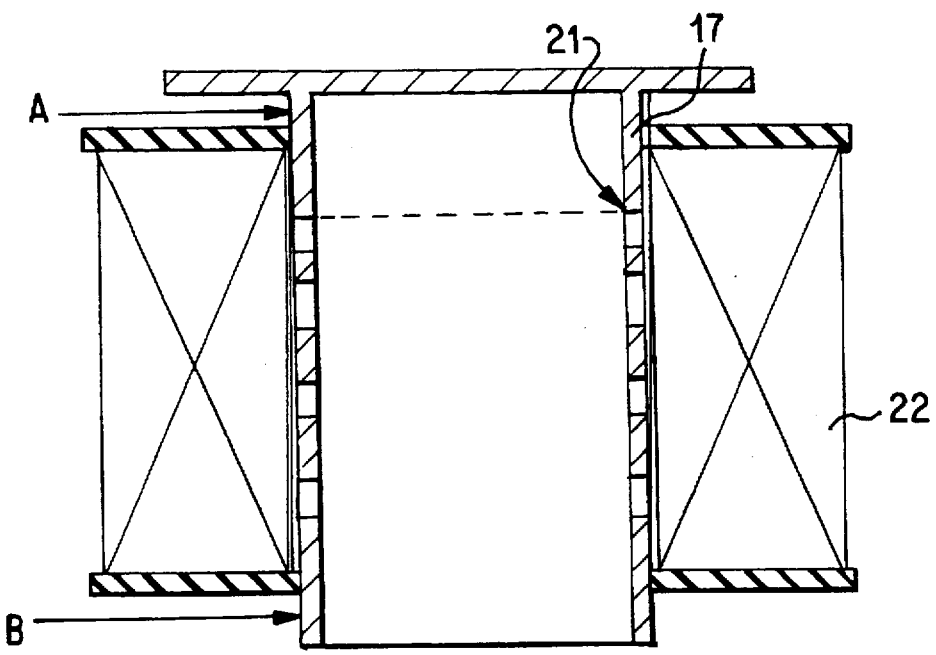
FIG. 7 is a sectional view of a filter element pushed onto a center tube.

FIG. 7 shows a cartridge which can be removed from the center tube in a particularly simple manner. In area A, the center tube 17 has its largest diameter and tapers because of a step 21 to the diameter in area B. In the drawing, the taper is exaggerated. In practice, a taper of about 0.3 mm to 2 mm was found to be advantageous. Of course, the center tube may also extend in the shape of a truncated cone. The filter element 22 is designed to be cylindrical; i.e. the two disk-like end plates of the filter element 22 have the same inside diameters. If the filter element 22 is pushed onto the center tube 17, the end disk which is in front, as viewed in the mounting direction, will expand a little more. Because of the flexibility of the end disk, the filter element will easily adapt to the center tube.

The important advantage of the stepped center tube is that the cartridge can be removed from the center tube by a slight jolt to the center tube and without being touched by any hand. The cartridge can therefore be exchanged without any special tools and without any contamination.

Figure 8:
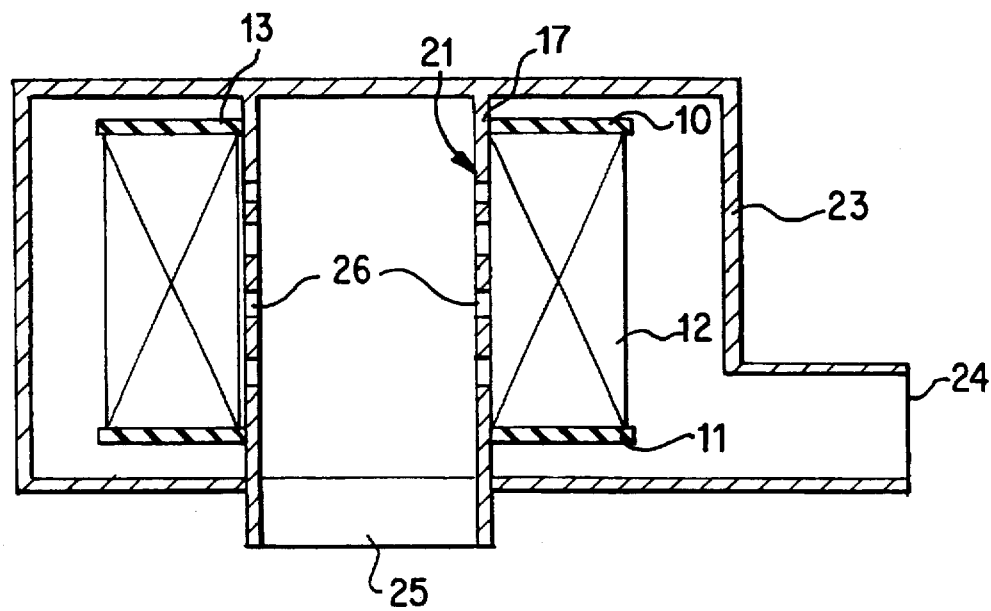
FIG. 8 is a sectional view of a filter insert according to the invention arranged in a housing with inlet and outlet openings.

FIG. 8 depicts a filter insert, comprising an accordion-folded annular filter element 12 with two resilient end plates 10 and 11, received on a center support tube 17 mounted within a housing 23. A fluid medium to be filtered enters the housing 23 through an inlet opening 24, passes through the filter element 12 and through apertures 26 in the center support tube 17, and then the filtered medium is discharged through outlet opening 25. The filter insert is sealed to the center support tube 17 by radial seals corresponding to FIG. 1a or FIG. 2a formed at the center openings of end plates 10 and 11.

The foregoing description and examples have been set forth merely to illustrate the invention and are not intended to be limiting. Since modifications of the described embodiments incorporating the spirit and substance of the invention may occur to persons skilled in the art, the invention should be broadly construed to include everything within the scope of the appended claims and equivalents thereof.

What is claimed is:

1. A filter arrangement comprising:
   a housing;
   a center tube connected with the housing and defining an outer peripheral surface,
   wherein said housing includes an inlet opening for a medium to be filtered and an outlet opening for discharge of the filter medium through said center tube; and
   a metal-free filter cartridge comprising an accordion-folded filter element arranged concentrically with said center tube and having end plates on axial end faces thereof, at least one of said end plates being an annular elastic end plate;
   wherein said annular elastic end plate has a thickness defined by a planar outer face which faces axially exteriorly of said cartridge and an inner face which faces axially interiorly of said cartridge, said elastic end plate having an outer peripheral surface facing radially outwardly and an exposed inner peripheral sealing surface facing radially inwardly, said inner peripheral sealing surface defining a central opening which receives said center tube, wherein said inner peripheral sealing surface sealingly abuts the outer peripheral surface of said center tube to form a radial seal therewith, an annular flexible support ring being embedded in said elastic end plate adjacent said radial seal, said support ring being substantially flat and having a planar outer face facing axially exteriorly of said cartridge, said outer face of the support ring being coplanar with said outer face of said end plate and being exposed adjacent said central opening, and said support ring having an exposed radially inwardly facing peripheral edge surface which is contiguous with the inner peripheral sealing surface of said elastic end plate and which abuttingly surrounds the outer peripheral surface of said center tube.

2. A filter arrangement according to claim 1, wherein said support ring comprises a thermoplastic element.

3. A filter arrangement according to claim 1, wherein at least one of said end plate and said support ring entirely covers an end of said filter cartridge.

4. A filter arrangement according to claim 1, wherein said flexible support ring comprises a different material than said elastic end plate.

5. A filter arrangement comprising:
   a housing;
   a center tube connected with the housing and defining an outer peripheral surface;
   wherein said housing includes an inlet opening for a medium to be filtered and an outlet opening for discharge of the filter medium through said center tube; and
   a metal-free filter cartridge comprising an accordion-folded filter element arranged concentrically with said center tube and having end plates on axial end faces thereof, at least one of said end plates being an annular elastic end plate;
   wherein said annular elastic end plate has a thickness defined by a planar outer face which faces axially exteriorly of said cartridge and an inner face which faces axially interiorly of said cartridge, said elastic end plate having an outer peripheral surface facing radially outwardly and an exposed inner peripheral sealing surface facing radially inwardly, said inner peripheral sealing surface defining a central opening which receives said center tube, wherein said inner peripheral sealing surface sealingly abuts the outer peripheral surface of said center tube to form a radial seal therewith, a flexible felt support ring being embedded in said elastic end plate adjacent said radial seal, said support ring being substantially flat and having a planar outer face facing axially exteriorly of said cartridge, said outer face of the support ring being coplanar with said outer face of said end plate and being exposed adjacent said central opening, and said support ring having an exposed radially inwardly facing peripheral edge surface which is contiguous with the inner peripheral sealing surface of said elastic end plate and which abuttingly surrounds the outer peripheral surface of said center tube.

6. A filter arrangement according to claim 5, wherein said felt ring and said elastic end plate each have a thickness, and the ratio of the thickness of the felt ring to the thickness of the elastic end plate is 1:4.

7. A filter cartridge comprising:
   an annularly arranged, accordion-folded filter element adapted to be arranged concentrically with a center tube and having end plates on axial end faces thereof, at least one end plate being an annular elastic end plate;
   wherein said elastic end plate has a thickness defined by a planar outer face which faces axially exteriorly of said cartridge and an inner face which faces axially interiorly of said cartridge, said elastic end plate having an outer peripheral surface facing radially outwardly and an exposed inner peripheral sealing surface facing radially inwardly, said inner peripheral sealing surface defining a central opening therein adapted to receive said center tube, said inner peripheral sealing surface being adapted to sealingly abut the outer peripheral surface of said center tube to form a radial seal therewith, an annular flexible support ring being embedded in said elastic end plate adjacent said radial seal, said support ring being substantially flat and having a planar outer face facing axially exteriorly of said cartridge, said outer face of the support ring being coplanar with said outer face of said end plate and being exposed adjacent said central opening, and said support ring having an exposed radially inwardly facing peripheral edge surface which is contiguous with the exposed inner peripheral sealing surface of said elastic end plate and adapted to abuttingly surround the outer peripheral surface of said center tube.

8. A filter cartridge according to claim 7, wherein said flexible support ring comprises a different material than said elastic end plate.

* * * * *